US007438091B2

(12) United States Patent
Murakami

(10) Patent No.: US 7,438,091 B2
(45) Date of Patent: Oct. 21, 2008

(54) CONSTRUCTION MACHINE

(75) Inventor: Masayuki Murakami, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 411 days.

(21) Appl. No.: 10/864,478

(22) Filed: Jun. 10, 2004

(65) Prior Publication Data

US 2004/0250860 A1 Dec. 16, 2004

(30) Foreign Application Priority Data

Jun. 13, 2003 (JP) ............................ 2003-169600

(51) Int. Cl.
*B60P 3/22* (2006.01)

(52) U.S. Cl. .................................. 137/899; 137/625.65

(58) Field of Classification Search ................. 137/443, 137/563, 899, 625.65; 280/834, 759; 37/414; 180/305, 306

See application file for complete search history.

(56) References Cited

U.S. PATENT DOCUMENTS

| | | | | |
|---|---|---|---|---|
| 3,902,735 | A * | 9/1975 | Bertram et al. | 280/759 |
| 4,275,902 | A * | 6/1981 | Teja | 280/766.1 |
| 4,833,798 | A * | 5/1989 | Ehrich | 37/414 |
| 6,581,506 | B1 * | 6/2003 | Shimada | 91/513 |
| 2006/0141230 | A1 * | 6/2006 | Miyoshi et al. | 428/216 |
| 2006/0151230 | A1 * | 7/2006 | Tatsuno et al. | 180/306 |

FOREIGN PATENT DOCUMENTS

| | | |
|---|---|---|
| EP | 0 848 113 | 6/1998 |
| JP | 2002-81093 | 3/2002 |

OTHER PUBLICATIONS

Patent Abstracts of Japan, JP 08-145003, Jun. 4, 1996.
Patent Abstracts of Japan, JP 2002-081093, Mar. 22, 2002.

* cited by examiner

*Primary Examiner*—John Rivell
*Assistant Examiner*—Cloud K Lee
(74) *Attorney, Agent, or Firm*—Oblon, Spivak, McClelland, Maier & Neustadt, P.C.

(57) ABSTRACT

The present invention relates to a construction machine having a working oil tank and a switching valve to open/close the pilot line of the hydraulic pressure control system, the return oil from the switching valve being put back to the tank at the bottom through a return pipe, wherein a drain pipe is provided at a portion of the return pipe lower than the tank, while a plug for opening/closing the drain pipe at the outlet thereof, the oil in the working oil tank being discharged through the return pipe in a case where the outlet is opened by the plug. This allows the simplification of the configuration of drain passage as well as the improvement of the efficiency of draining works.

3 Claims, 2 Drawing Sheets

CONSTRUCTION MACHINE

BACKGROUND OF THE INVENTION

1. Filed of the Invention

The present invention relates to a construction machine such as a hydraulic excavator or a wheeled crane.

2. Description of the Related Art

Hydraulic oil tank mounted on a hydraulic excavator is arranged over the frame of the upper rotating body by means of a support member to ensure a predetermined clearance as disclosed, for example, in Japanese Patent Laid-Open Publication No.2002-081093.

This clearance is utilized to arrange oil feed port and/or many hydraulic pipes.

The support member above is made of pipe materials, the upper end of which being connected to the bottom surface of the hydraulic oil tank, while the lower end onto the frame.

This support member operates as a drain passage to discharge the hydraulic oil in the hydraulic oil tank and there is provided an opening at the frame side. Drain bolt inserted through this opening is detachably attached to a female screw part formed on the inner wall at the lower part of the support member.

In this case, it is necessary not only to couple the hydraulic oil tank and the frame through the support member but also to provide an opening in the frame, and further to provide a drain bolt fitting part in the support member, which results in making the configuration of the drain passage complicated.

In addition, the drain bolt should be installed from under the lower frame arranged between crawlers on the left and right side, resulting in poor workability.

SUMMARY OF THE INVENTION

Accordingly, an object of the present invention is to provide a construction machine that allows the simplification of the configuration of drain passage as well as the improvement of the efficiency of draining works.

The construction machine of the present invention has the following basic constitution.

That is, the construction machine has a hydraulic oil tank or a working oil tank, a switching valve to open/close a pilot line of a hydraulic pressure control system that controls an operation of the construction machine, and a return pipe for a passage of a return oil as working oil from the switching valve, the return pipe being formed in such a manner to put the return oil back to the oil tank therethrough. Further, the construction machine has a drain pipe connected to a portion of the return pipe lower than the hydraulic oil tank, and an opening and closing means provided at an outlet of the drain pipe to open/close the drain pipe. The opening and closing means is formed in such a manner that the oil in the oil tank is discharged from the outlet of the drain pipe through the return pipe if the outlet is opened by the means.

Arranging lower than the oil tank here means that the switching valve has only to be arranged at a position lower than the oil tank in order to have an enough vertical interval therebetween to discharge the oil in the oil tank.

In accordance with the present invention, the drain pipe is provided in a branching manner at a portion of the return pipe lower than the oil tank, and thereby the oil in the oil tank is guided to the outlet of the drain pipe through the return pipe and then discharged therefrom if the outlet is opened by the opening/closing means.

The return pipe can also be used as a drain passage to allow the simplification of the pipes around the oil tank.

DESCRIPTION OF THE PREFERRED EMBODIMENTS

Figure 1:
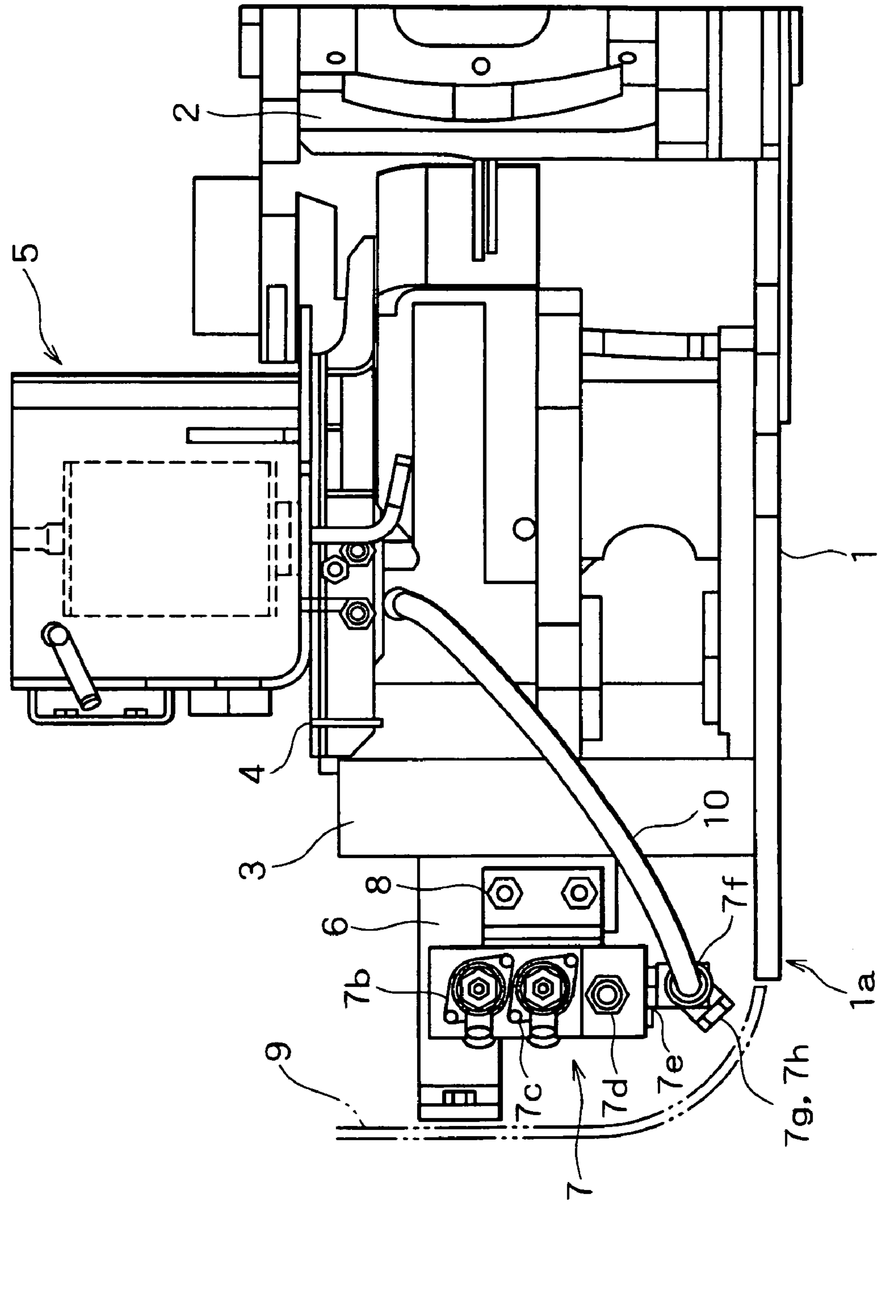
FIG. 1 is a front elevational view showing the configuration of return pipe of a construction machine embodying the present invention.

The construction machine according to the present invention will be more fully understood from the following description based on the embodiment shown in the drawings.

FIG. 1 shows one embodiment of the configuration of a hydraulic oil tank or working oil tank in the construction machine according to the present invention.

This figure is a front elevational view showing the constitution in the upper rotating body of the construction machine, where the numerical 1 indicates a rotating frame of the upper rotating body. The upper rotating body is rotatably loaded on a lower traveling body not shown in the figure.

At the almost center of the rotating frame 1 is provided a swing bracket 2 to support a swing boom not shown in the figure. Also, an upper plate 4 is provided on a support 3 which is disposed from the rotating frame 1.

The clearance between the rotating frame 1 and the upper plate 4 is utilized, for example, as a space to arrange many hydraulic pipes on the rotating frame 1. The numerical 5 is a hydraulic oil tank installed on the upper plate 4.

Also, a solenoid switching valve (as a switching valve) 7 is fitted to a bracket 6 provided in extended manner, horizontally, from the support 3 using bolts 8 as a type of fixing means.

The solenoid switching valve 7 opens/closes the pilot line in accordance with a movement of a lift lever (not shown in the figure) which is operated on an operator's getting on/off the machine, the lift lever being arranged on the boarding/alighting side of an operator's seat. The lift lever is pulled up when an operator gets out of his or her seat (non-operational state), while pressed down when the operator sits in the operator's seat for driving the machine.

To be more specific, the solenoid switching valve 7 is interposed in the pilot line between a pilot pump and a remote control valve, both of which being not shown in the figure, in such a manner to shut off current to the solenoid of the solenoid switching valve 7 if the lift lever is pulled up, and thereby to cut off the pilot line as an oil passage leading to each remote control valve, which makes it possible to prevent erroneous operations in a non-operational state of the construction machine. Meanwhile, pressing down the lift lever gets through the pilot line to shift the construction machine to an operable state. The lift lever can be called lift cut-off lever due to its operation also as a cut-off lever for the pilot line.

As described above, it is preferable to provide the solenoid switching valve 7 as a switching valve. The solenoid switching valve 7 opens/closes the oil passage from the pilot pump through the remote control valve interlocking with opening/closing operation of the lift cut-off lever to prevent hydraulic apparatus from erroneously operating in a non-operational state of the construction machine.

It is, therefore, possible to fix the end part of pipes such as an after-mentioned hose 10 using the solenoid switching valve 7.

Figure 2:
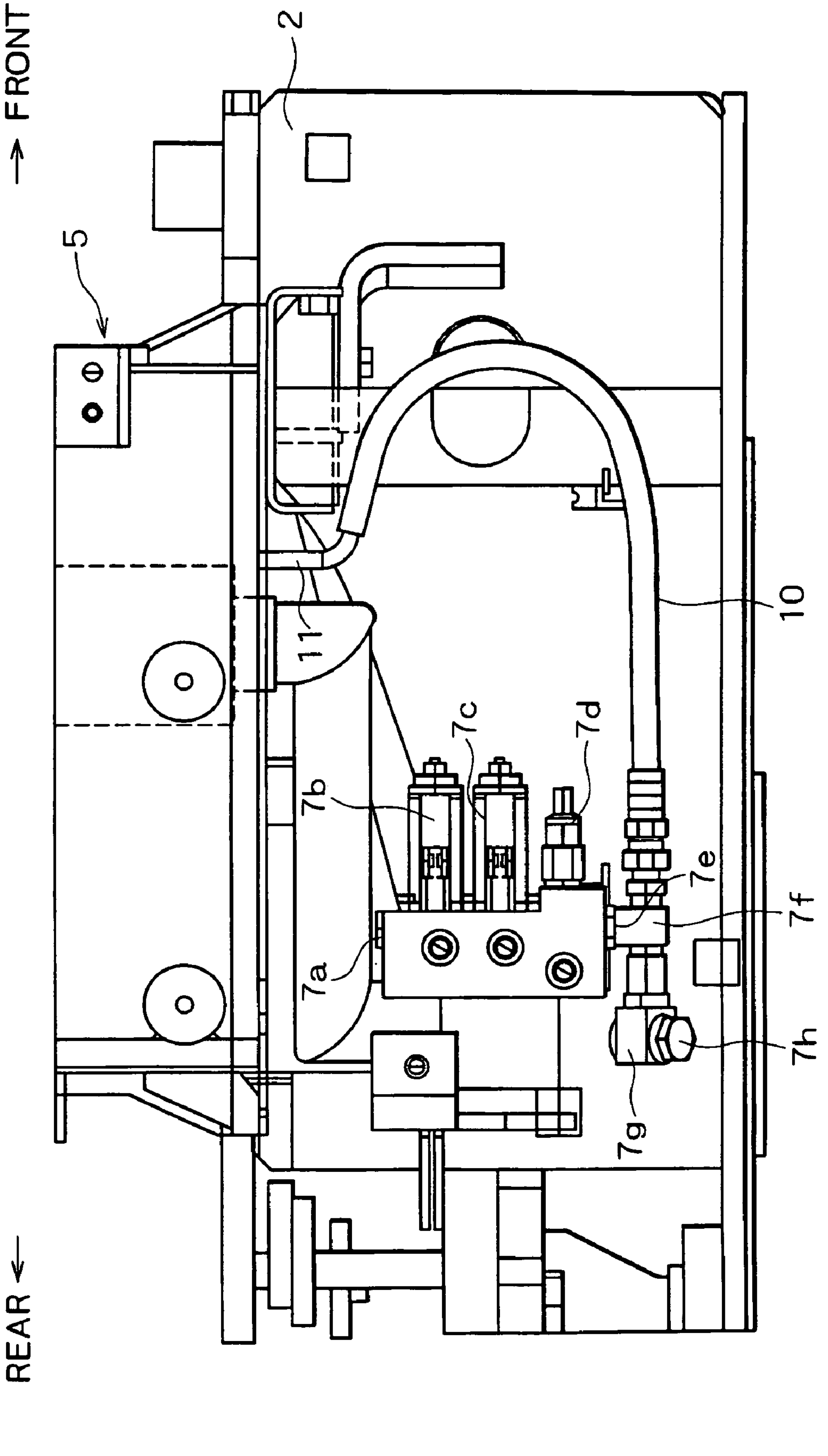
FIG. 2 is a side elevational view of FIG. 1.

The solenoid switching valve 7 is arranged at the outer peripheral part (adjacent to the outer peripheral side edge part 1*a*) of the rotating frame 1, that is, at the nearest position to the inner wall of a main body cover 9. On the upper surface of the main body is disposed a P-port 7*a* through which the oil from the pilot pump is provided, while on the side surface of the main body are disposed a first port 7*b* to third port 7*d* to send the oil provided to each remote control valve, as shown in FIG. 2. On the underside of the lower surface of the main body is also disposed a T-port (as a connecting part on the side of the switching valve) 7*e* to put oil back to the hydraulic oil tank 5.

A T-pipe 7*f* is connected to the T-port 7*e*, and one (front side) outlet of the T-pipe 7*f* is connected through the hose 10 to an L-pipe 11 suspended from the bottom surface of the hydraulic oil tank 5. The end part of the hose 10 is to be connected to the T-port 7*e*. The T-pipe 7*f* and hose 10 operates as return pipes.

The other (rear side) outlet of the T-pipe 7*f* is connected to a drain pipe 7*g*, a drain plug 7*h* as an opening and closing means being fastened to the drain pipe 7*g* with screws.

Next, the draining work in the construction machine having the above-described constitution will then be explained referring to FIG. 1.

The main body cover 9 of the upper rotating body is disposed outside the solenoid switching valve 7 as a switching valve and is formed openably.

The solenoid switching valve 7 appears in a state of protruding outward from the outer peripheral side edge part 1*a* of the rotating frame 1 when the main body cover 9 is opened.

In this state, a saucer as container for the working oil is prepared under the solenoid switching valve 7, and the drain plug 7*h* is removed from the drain pipe 7*g*.

When the drain plug 7*h* is removed, the oil runs out of the hydraulic oil tank 5 through the hose 10 arranged slantwise downward to be discharged from the opening of the drain pipe 7*g* and to be piled up in the saucer.

As described above, the openable main body cover 9 disposed outside the solenoid switching valve 7 enables simple and easy draining works from outside the machine.

Further, it is preferable to arrange the solenoid switching valve 7 as a switching valve at a position lower than the hydraulic oil tank 5 as well as at the outer peripheral part of the rotating frame 1 of the upper rotating body. The solenoid switching valve 7 can be utilized to provide the drain pipe 7*g* in a branching manner at the connecting part of the T-pipe 7*f* as a return pipe and the hose 10 on the side of the switching valve.

In this embodiment, the T-port 7*e* and the hose 10 operate as, what is called, a return oil passage, wherein the return oil is put back to the hydraulic oil tank 5 from the T-port 7*e* through the hose 10 in a state of mounting the drain plug 7*h*. Also, if the drain plug 7*h* is removed, the oil in the hydraulic oil tank 5 is guided to the drain pipe 7*g* through the hose 10 to be discharged, which allows the return oil passage to operate as a drain passage.

Furthermore, in this embodiment, workers can discharge the oil in the hydraulic oil tank 5 with a simple operation of just removing the drain plug 7*h* from outside the crawler as the lower traveling body. Therefore, workers can get rid of complicated works in the conventional draining work of crawling under the lower frame between the crawlers and of removing the drain plug with their backs down.

Although the embodiment above explains the configuration of directly fitting the drain pipe 7*g* to the T-port 7*e* of the solenoid switching valve 7, another configuration not restricted thereto can be adopted, that is, a drain pipe may be provided at the hose 10 that connects the T-port 7*e* of the solenoid switching valve 7 and the hydraulic oil tank 5. In this case, it is preferable to fit the drain pipe to a portion of the hose 10 lower than the hydraulic oil tank 5. It is more preferable to fit the drain pipe to the portion where the hose 10 is suspended most vertically.

The above embodiment is also constituted so that the drain pipe and the bracket for fixing can be removed by utilizing the return pipe from the solenoid switching valve 7 arranged at the outer peripheral part 1*a* of the rotating frame. Another pipe for draining may be provided separately from the return pipe as another embodiment, whereby the end part of the hose 10 can be fixed by utilizing, for example, a frame existing on the outer peripheral part 1*a* of the rotating frame.

Although the invention has been described with reference to the preferred embodiments in the attached figures, it is noted that equivalents may be employed and substitutions made herein without departing from the scope of the invention as recited in the claims.

I claim:

1. A construction machine comprising:

a lower traveling body and an upper rotating body rotatably mounted on the lower traveling body, said upper rotating body having a rotating frame;

a working oil tank;

a switching valve adapted to open and close a pilot line of a hydraulic pressure control system that controls an operation of the construction machine, wherein said switching valve is provided at a position lower than said working oil tank and is at an outer peripheral part of said rotating frame;

a return pipe for a passage of a return oil from said switching valve, the return oil being put back to said working oil tank through said return pipe;

a drain pipe branched from a portion of said return pipe, said portion of said return pipe being located at a lower position than that of said working oil tank and lower than a position of said switching valve; and an opening and closing means provided at an outlet of said drain pipe to open and close said drain pipe such that the oil can be drained from the working oil tank, switching valve, return pipe and drain pipe via the outlet of said drain pipe.

2. The construction machine according to claim 1, wherein said switching valve is a solenoid switching valve adapted to open and close an oil passage from a pilot pump through a remote control valve in accordance with an operation of a lever arranged in the vicinity of an operator's seat, said lever being operated when the operator gets on and off the construction machine.

3. The construction machine according to claim 1, wherein a main body cover of said upper rotating body is disposed outside said switching valve, said main body cover being connected openably to said upper rotating body.

* * * * *